Dec. 3, 1968     A. LECOMTE ET AL     3,414,319
SUN ROOF CONTROL DEVICES
Filed Feb. 13, 1967     2 Sheets-Sheet 1
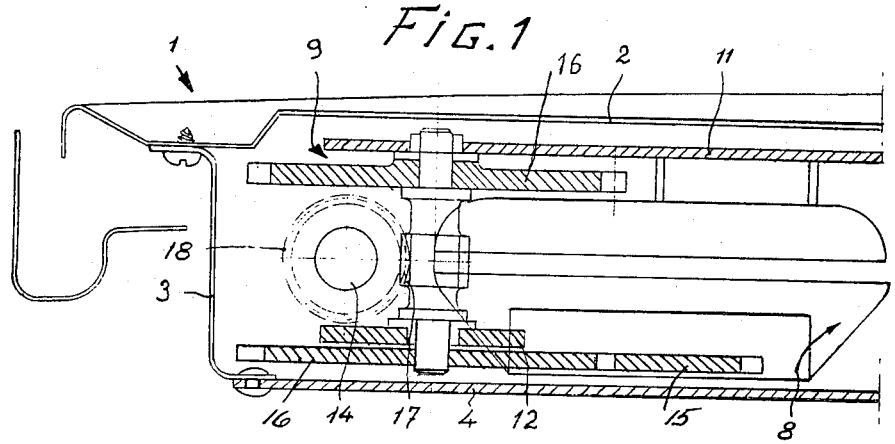
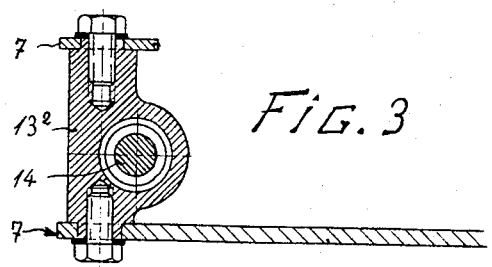
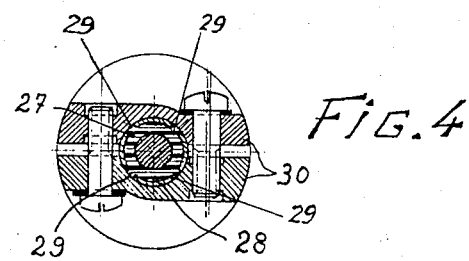
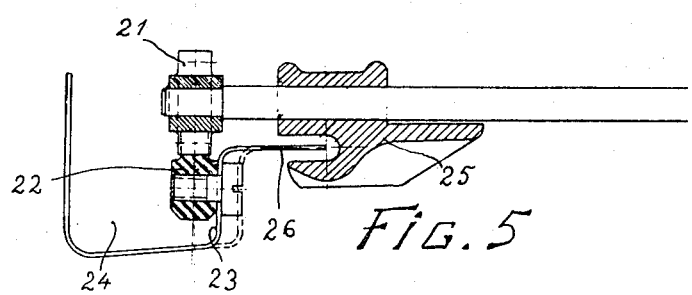

United States Patent Office 3,414,319
Patented Dec. 3, 1968

3,414,319
SUN ROOF CONTROL DEVICES
Alexandre Lecomte and Pierre Ventre, Billancourt, Hauts-de-Seine, France, assignors to Regie Nationale des Usines Renault, Billancourt, Hauts-de-Seine, France
Filed Feb. 13, 1967, Ser. No. 615,725
Claims priority, application France, Feb. 18, 1966, 50,210
9 Claims. (Cl. 296—137)

ABSTRACT OF THE DISCLOSURE

The present invention relates to control device for the sun roof of a vehicle which comprises a rigid movable panel displaceable in a frame structure provided with guideways, this device consisting of an electric-motor and reduction-gearing unit having a vertical axis and housed substantially in the thickness of the movable panel and adapted to transmit the torque to a pair of pinions having an horizontal axis and in constant meshing engagement with a pair of racks disposed laterally on either side of the longitudinal axis along which the panel is movable.

This invention relates to sun roofs of vehicles and has a specific reference to a device for controlling a sun roof of the type comprising a rigid panel slidably mounted in a frame provided with lateral guideways.

The control device according to this invention consists of an electric-motor and reduction-gearing unit having a vertical axis which is housed substantially within the thickness of the movable panel and adapted to transmit the necessary driving torque to a pair of pinions having horizontal axes and in constant meshing engagement with relevant racks disposed laterally on either side of the longitudinal axis of displacement of the panel.

With this device and by selecting an electric motor having a very flat winding it is possible to equip sun roof panels of relatively reduced thickness.

Other features and advantages of this invention will appear as the following description proceeds with reference to the accompanying drawings illustrating diagrammatically by way of example a typical form of embodiment of this invention. In the drawings:

FIGURE 1 is a section taken across the unit along the line A—A of FIGURE 2, to show the position of the motor and reduction-gearing unit relative to the sliding panel;

FIGURE 3 is a section taken upon the line B—B of FIGURE 2 but rotated in the direction of the arrow and showing one of the distance-pieces of the bearing-forming frame structure;

FIGURE 4 is a section taken upon the line C—C of FIGURE 2, showing the half collars for clamping one of the coupling members; and FIGURE 5 is a section taken upon the line D—D of FIGURE 2, showing the position of a rack relative to the rain-strap of the sliding panel frame, and the manner in which this panel is guided.

Figure 2:
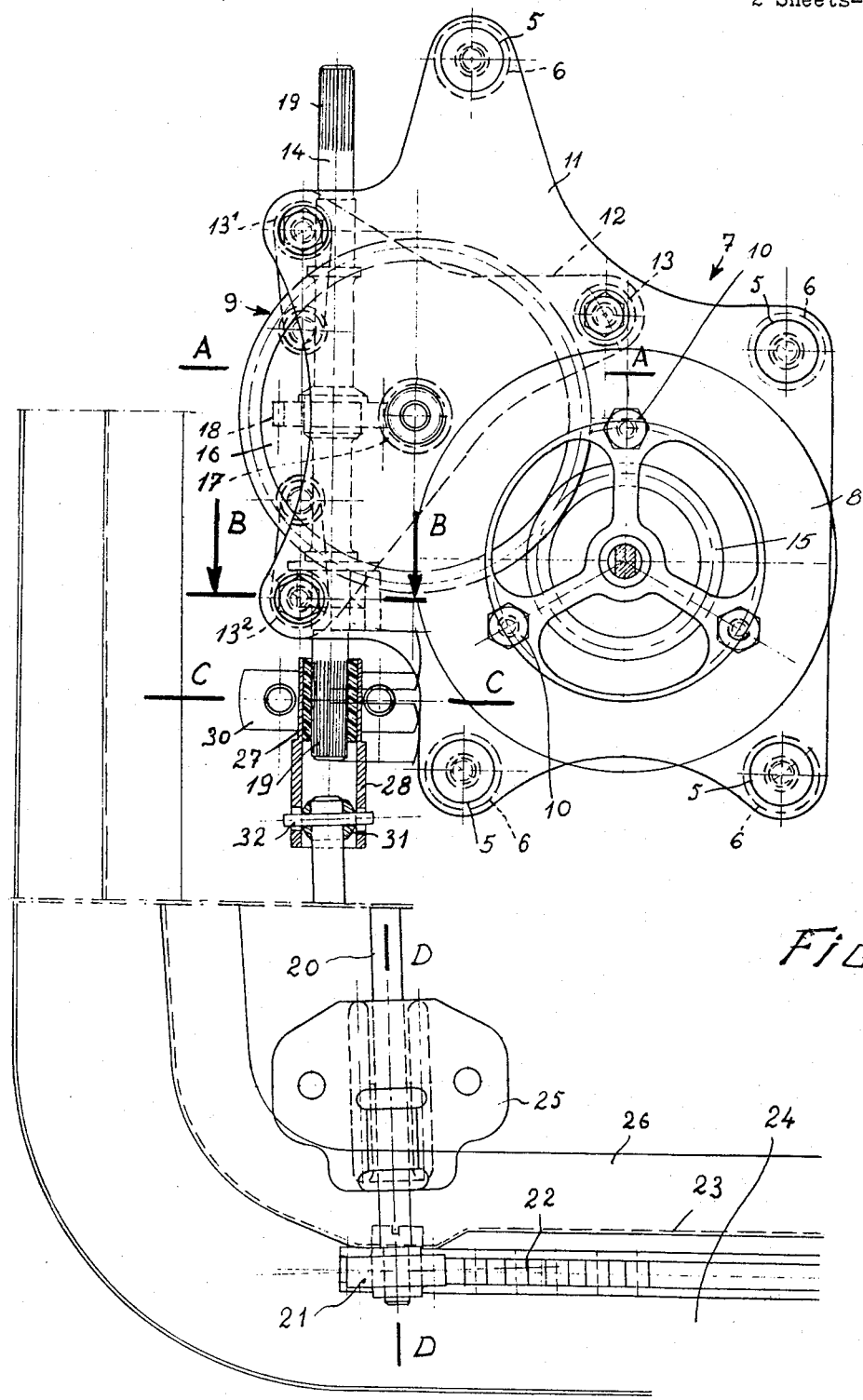
FIGURE 2 is a plan view of the motor and gearing unit with its supporting frame structure and one of the driving pinions meshing with the relevant rack, the sliding panel being omitted for the sake of clarity.

In the example illustrated the movable panel of the sun roof which is designated in general by the reference numeral 1 comprises a reinforcing cross member 2, a peripheral vertical strip 3 and an inner lining 4 visible from the inside of the vehicle.

A frame 7 is secured to the cross member 2 and within the thickness of the sliding panel 1 by means of four fastening devices 5 to which an adequate elasticity is imparted by suitable rubber grommets 6 this frame 7 constituting a rigid support for on the one hand an electric motor 8 having a vertical axis and a flat winding, and on the other hand a reduction gearing 9. The motor 8 is secured to the frame 7 by means of fastening members 10 of the centering socket type.

The frame 7 consists of an upper plate 11 and a lower plate 12, the former being used for securing the assembly to said cross member 2. Both plates 11, 12 are held at the desired relative spacing by spacers 13 of which two, $13^1$ and $13^2$, are adapted to constitute the bearings of a horizontal transmission shaft 14.

The motor output shaft has keyed thereon a driving toothed wheel 15 meshing with another, larger toothed wheel 16 of the reduction gearing, this wheel 16 being rigid with a worm 17. This worm meshes in turn with a gear 18 rotatably driving the transmission shaft 14.

This transmission shaft 14 is splined at either ends 19 and is coupled through these splines with lateral shafts 20 each rigid with a pinion 21. Each pinion 21 is in constant meshing engagement with a rack 22 secured along the vertical wall 23 of the longitudinal rain-strap 24 of the sliding panel frame 1. Each shaft 20 carries in the vicinity of the relevant pinion 21 a guide member 25 of antifriction material which cooperates with a lateral guideway 26 for adequately guiding the pinion 21.

The coupling between the transmission shaft 14 and each lateral shaft 20 is effected on the one hand through a socket 27 of resilient material slipped on the splines 19, a sleeve 28 split at 29 along one fraction of its length being clamped on this socket by a pair of half collars 30, and on the other hand by a ball-shaped member 31 of suitable plastic material which is slipped on the relevant shaft 20 and fitted on the sleeve 28 to which it is locked by a cross pin 32.

This type of coupling is particularly advantageous in that it permits an angular adjustment of the shafts 20 (and therefore the setting of the pinions 21 with respect to their racks) and also an adjustment thereof in the direction of translation.

Of course, the present invention should not be construed as being limited by the specific form of embodiment illustrated and described herein, since many modifications and variations may be brought thereto without departing from the spirit and scope of the invention as set forth in the appended claims.

We claim:
1. A control device for the sun roof of a vehicle having a rigid movable panel of a predetermined thickness displaceable in a frame structure provided with guideways, said device comprising a drive and reduction-gearing unit carried within said panel and having a vertical output shaft, the height of said unit being less than said predetermined thickness of said panel, a pair of rack members disposed on said frame structure to each side of said panel, a pair of pinions fixed to said panel and having a horizontal axis, said pinions respectively engaging said rack members, and transmission means to transmit the torque output of said output shaft to said pinions.
2. A device according to claim 1, wherein said drive unit is in the form of an electric motor having a flattened winding.
3. A device according to claim 1, wherein said pinions are also disposed within said predetermined thickness of said movable panel.
4. A device according to claim 1, wherein said racks are secured in the longitudinal rainstraps of the frame structure, along vertical walls.
5. A device according to claim 1, wherein said drive and reduction-gearing unit is carried by a structure comprising an upper plate constituting a member for securing the assembly to the movable panel and a lower plate secured to said upper plate by means of at least two spacing members constituting the horizontal axis bearings of said transmission means.

6. A device according to claim 1, wherein said transmission means comprises a transmission shaft and a worm gear having a vertical axis and in constant meshing engagement with a gear carried by said transmission shaft.

7. A device according to claim 1, wherein said transmission means comprises a transmission shaft and coupling means coupling each end of said transmission shaft to a shaft rigid with said pinions.

8. A device according to claim 7, wherein said coupling means includes means permitting angular setting and translational adjustment of said pinions.

9. A device according to claim 7, wherein said coupling means comprises a flexible socket slipped on splines formed on the transmission shaft and clamped by a split sleeve secured by a pair of half-collars, a ball-shaped member of plastic material slipped on the shaft to be coupled and engaging the bore of said sleeve, and a cross-pin for retaining said ball-shaped member in said sleeve.

References Cited

UNITED STATES PATENTS 2,774,624  12/1956  Lower _____ 296—137

BENJAMIN HERSH, *Primary Examiner.*

R. R. SONG, *Assistant Examiner.*